United States Patent [19]
Korpimaa

[11] Patent Number: 5,368,322
[45] Date of Patent: Nov. 29, 1994

[54] TRUCK HAVING A SPRING SUSPENSION

[75] Inventor: Heikki Korpimaa, Tampere, Finland

[73] Assignee: Valmet Transmec Ltd. Oy, Finland

[21] Appl. No.: 976,270

[22] Filed: Nov. 13, 1992

[30] Foreign Application Priority Data

Nov. 15, 1991 [FI] Finland ................... 915396

[51] Int. Cl.$^5$ .............................. B60G 11/26
[52] U.S. Cl. .................... 280/709; 280/702; 280/43.18; 280/43.23
[58] Field of Search ............... 280/709, 702, 698, 693, 280/690, 691, 43.18, 43.23

[56] References Cited

U.S. PATENT DOCUMENTS

| | | | |
|---|---|---|---|
| 3,117,800 | 1/1964 | Magnuson | 280/702 |
| 3,439,927 | 4/1969 | Ryskamp | 280/6 |
| 3,445,122 | 5/1969 | Cadiou | 280/702 |
| 3,528,675 | 9/1970 | Brown | 280/43.23 |
| 4,089,544 | 5/1978 | Raidel | 280/709 |
| 4,174,854 | 11/1979 | Spicka et al. | 280/702 |
| 4,422,667 | 12/1983 | Perry | 280/705 |
| 4,875,706 | 10/1989 | Joseph et al. | 280/709 X |
| 4,900,055 | 2/1990 | Wright | 280/709 X |
| 5,135,065 | 8/1992 | Kawasaki et al. | 280/709 X |

FOREIGN PATENT DOCUMENTS 2717388  10/1978  Germany .

*Primary Examiner*—Margaret A. Focarino
*Assistant Examiner*—Christopher P. Ellis
*Attorney, Agent, or Firm*—Steinberg, Raskin & Davidson

[57] ABSTRACT

A truck, such as a fork-lift truck, a counterweight truck or equivalent, is disclosed. The truck is provided with one driving axle unit, a steering axle unit, and lifting and load handling equipment. The axle units of the truck are suspended and supported on a frame of the truck by means of a vertically adjustable spring suspension. The spring units of the spring suspension are adjustable between a suspended upper position and a lower position, in which lower position the frame of the truck rests unsuspended on the axle beams of the axle units. The spring units are preferably hydraulic cylinders, each of which communications with a hydropneumatic pressure-accumulator/ check-valve assembly that operates as a spring/shock-absorber unit.

17 Claims, 4 Drawing Sheets

TRUCK HAVING A SPRING SUSPENSION

FIELD OF THE INVENTION

The present invention relates to a truck, such as a fork-lift truck, a counterweight truck or equivalent, which is provided with at least one driving axle unit, a steering axle unit, and lifting and load handling equipment.

BACKGROUND OF THE INVENTION

It is a feature typical of counterweight trucks that they are capable of lifting and transferring a load whose weight is far above one half, usually about 65%, of the tare weight of the truck. When the truck is not lifting a load, the weight of the truck is almost evenly divided between the two axles of the truck. However, for a truck lifting a full load, most of the total weight of the truck rests on the front axle of the truck, which is normally the driving axle. Thus, the axle loads of the truck vary quite extensively depending on the load.

Owing to the high variations in the axle load, nowadays the trucks are generally constructed without a spring suspension. The axles are rigidly fixed directly to the truck frame, or, in particular in the case of the steering axle, the axle may be mounted pivotally on the frame. Spring suspension has usually not been used in trucks because the variations in the axle load would be excessively large if a spring suspension were operative under all circumstances of operation of the truck.

Furthermore, a truck without a spring suspension has a substantial drawback in that the truck usually becomes uncontrollable at speeds higher than about 30 km per hour because it has no shock absorption system. Thus, the truck without a spring suspension is unable to operate at speeds higher than about 30 km/hour even when unloaded, or otherwise during a transfer operation or equivalent. At present, this is a significant drawback, because it is desired that the equipment be used as efficiently as possible, whereby any unproductive operation would be carried out as quickly as possible.

In addition, when the truck is transferred from one place to another, it has often been necessary to employ specialized transportation equipment which has constituted quite an important cost factor. Thus, the transfer of the truck with specialized equipment is, for example, an unproductive operation of the truck.

OBJECTS AND SUMMARY OF THE INVENTION

An object of the present invention is to provide a new and improved truck in which the drawbacks of the prior art are eliminated.

It is another object of the present invention to provide a new and improved truck having a spring suspension.

It is yet another object of the present invention to provide a new and improved truck, such as a counterweight truck, a fork-lift truck or equivalent, by whose means it is possible to carry out working operations characteristic of a truck with a high payload capacity. The payload of the truck of the present invention, as compared with the tare weight of prior art trucks, is high and at least of the same order as that of the conventional fork lift trucks.

A further object of the present invention is to provide a new and improved truck that can, when necessary, be operated at high speeds, considerably higher than about 30 km/h, so that, when transferring the truck from one place to another, it is unnecessary to use particular transfer equipment or other specialized transportation equipment.

In view of achieving the above objects of the invention, in the present invention the axle units of the truck are suspended and supported on the frame of the truck by means of a vertically adjustable spring suspension.

A truck constructed in accordance with the invention has, in principle, two modes of operation. When the truck is working and loaded, it operates in the conventional way without spring suspension. On the other hand, during transfer operation of the truck, for instance between work sites, which takes place without the truck being loaded, the truck operates with a spring suspension.

As a result of this configuration of the invention, a number of remarkable advantages are achieved over the prior art devices. For example, specialized transportation equipment is not needed when transferring the truck between work locations. Rather, the truck in accordance with the present invention can be transferred from one place to another by means of its own engine power while operating at normal or almost normal highway speeds. Even if the technical construction of a truck in accordance with the invention is somewhat more complicated and, thus, more expensive than that of conventional trucks, the advantages obtainable by means of the invention are considerably more important than this minor drawback.

Other advantages and characteristic features of the invention will come out from the following detailed description of the invention.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1:
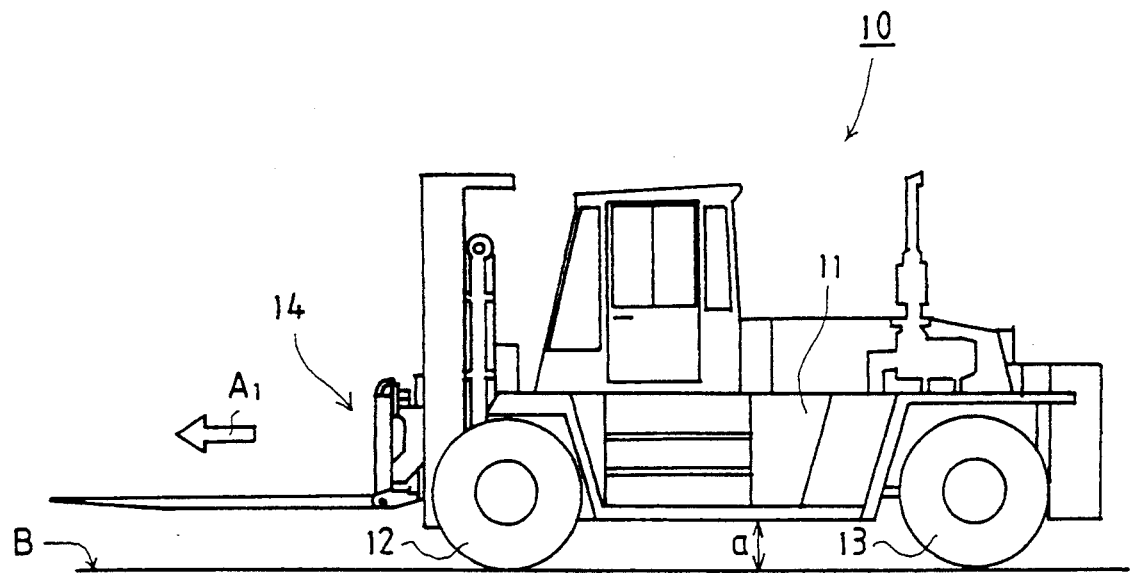
FIG. 1 is a schematic side view of a truck in accordance with the present invention wherein the truck is in a working position with the spring suspension lowered.
Figure 2:
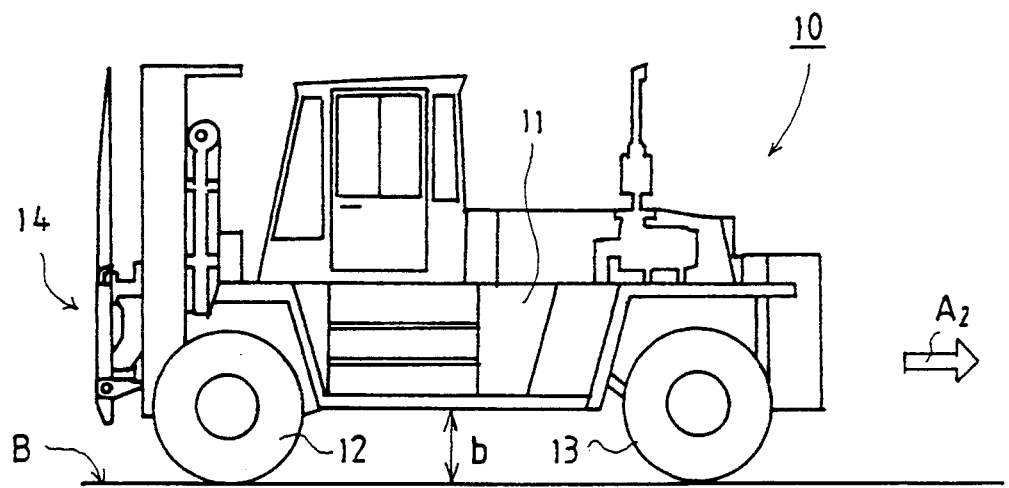
FIG. 2 is a schematic side view of a truck in accordance with the present invention wherein the truck is in the "high-speed drive"[position with the spring suspension raised.

In FIGS. 1 and 2 in the drawing, a truck in accordance with the present invention is denoted generally with reference numeral 10. The truck 10 has a frame which is denoted with reference numeral 11, a driving axle unit denoted with reference numeral 12, and a steering axle unit denoted with reference numeral 13. In a conventional way, the truck 10 is provided with lifting and load handling equipment 14. Other parts of the truck are not denoted with reference numerals, because they are not essential in view of the invention, but they may be constructed fully in accordance with prior art.

As is shown in FIGS. 1 and 2, the truck 10 rests on its wheels on a base B. In the embodiment shown in FIG. 1, the truck 10 is shown in the working position, in which case the ground clearance a between the truck frame 11 and the base B is small. In such a case, the truck 10 has no spring suspension, and its frame 11 rests directly on its axles, so that the truck 10 is not suspended by springs. Thus, in the case of FIG. 1, the truck 10 operates in the manner of a conventional truck.

In FIG. 2, the ground clearance h between the truck frame 11 and the base B is considerably larger than the ground clearance a shown in FIG. 1. In the embodiment shown in FIG. 2, the truck 10 is raised onto the support of its springs, in which case the truck 10 is spring-suspended in a so-called "high-speed drive" position. In this position, the lifting and load handling equipment 14 of the truck has been raised out of the working position.

In the embodiment shown in FIG. 2, the truck 10 is operated preferably for transfer operation, i.e. moving the truck between work sites, in which case its main running direction is usually opposite to that shown in FIG. 1. In FIG. 1, the main running direction, i.e. the working direction, is denoted with the arrow $A_1$, and in FIG. 2, the main running direction, i.e., for example, the transfer direction, is denoted with the arrow $A_2$.

FIGS. 3A–3C and 4A–4C are further detailed illustrations of constructions of the axle suspensions in the truck 10, by whose means the functions as shown in FIGS. 1 and 2 can be accomplished.

Figure 3A:
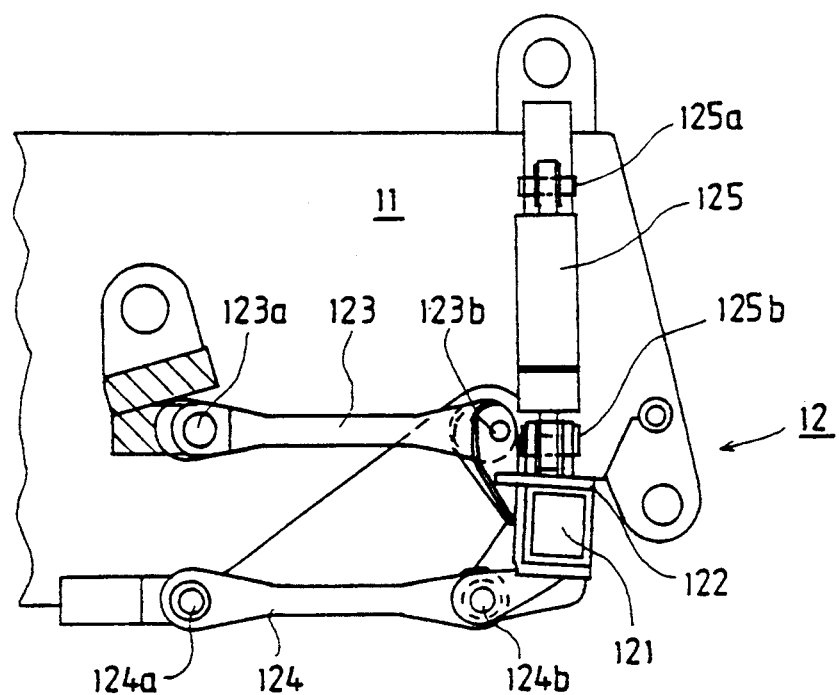
FIGS. 3A, 3B and 3C are further detailed illustrations of the arrangement of suspension and support of driving axle of a truck in accordance with the present invention, FIG. 3A being a side view of the axle unit partly in section, FIG. 3B being a top view of the corresponding axle unit, and FIG. 3C illustrating the axle unit as viewed in the longitudinal direction of the truck.
Figure 3B:
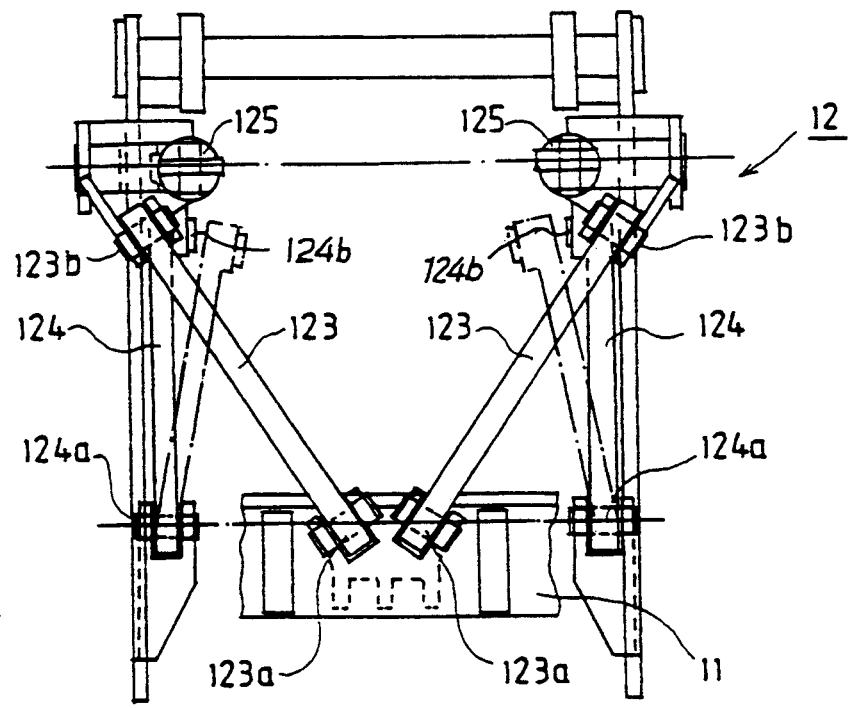
Figure 3C:
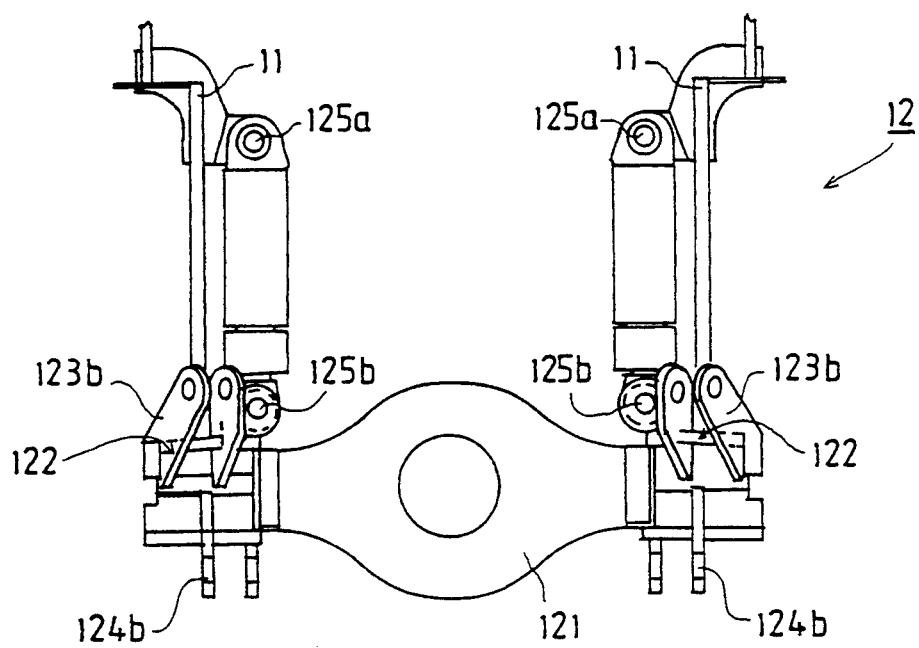

FIGS. 3A–3C illustrate the suspension of the driving axle unit of the truck 10. The truck frame is denoted with the reference numeral 11, and the driving axle unit generally with the reference numeral 12. The support and the spring suspension of an axle beam 121 of the driving axle unit 12 are accomplished by means of an articulated multi-link suspension, which consists of upper suspension arms 123, lower suspension arms 124, and shock absorber units, i.e. spring units 125, which have been arranged symmetrically in relation to the longitudinal center line of the truck 10.

In the embodiment shown in FIGS. 3A–3C, the upper suspension arms 123 are diagonal suspension arms, whose first fastening brackets 123a on the truck frame 11 are placed more distant from one another than the second fastening brackets 123b of the suspension arms placed on the axle beam 121. The fastenings of the upper suspension arms 123 at the fastening brackets 123a, 123b are provided with articulated joints. The lower suspension arms 124 are longitudinal suspension arms whose first fastening brackets 124a on the truck frame 11 are placed substantially equidistant from one another as the second fastening brackets 124b on the axle beam 121 are placed from one another. Also, the fastenings of the lower suspension arms 124 are provided with articulated joints in a corresponding way.

By means of the illustrated embodiments, as is commonly known with respect to the suspension of axle units, lateral movements of the axle beam 121 are prevented. However, in other embodiments, it would be possible to substitute for this construction, e.g., a solution in which both the upper and the lower suspension arms 123, 124 are diagonal suspension arms, (as shown in phantom in FIG. 3B) or by some other corresponding construction which permits vertical movements of the axle beam 121 while substantially preventing lateral movements of the axle beam 121.

Figure 4A:
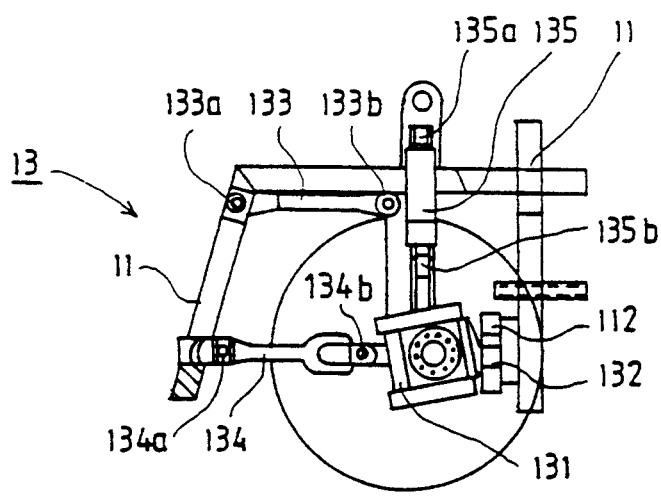
FIGS. 4A, 4B and 4C are further detailed illustrations of the arrangement of suspension and support of the steering axle of a truck in accordance with the present invention, FIG. 4A being a side view of the axle unit partly in section, FIG. 4B being top view of the corresponding axle unit, and FIG. 4C illustrating the axle unit as viewed in the longitudinal direction of the truck.
Figure 4B:
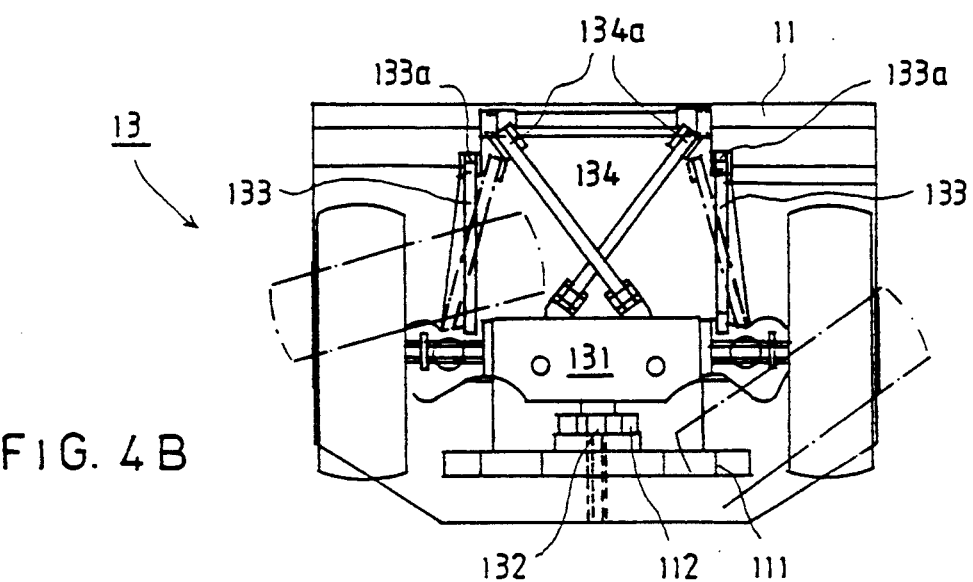
Figure 4C:
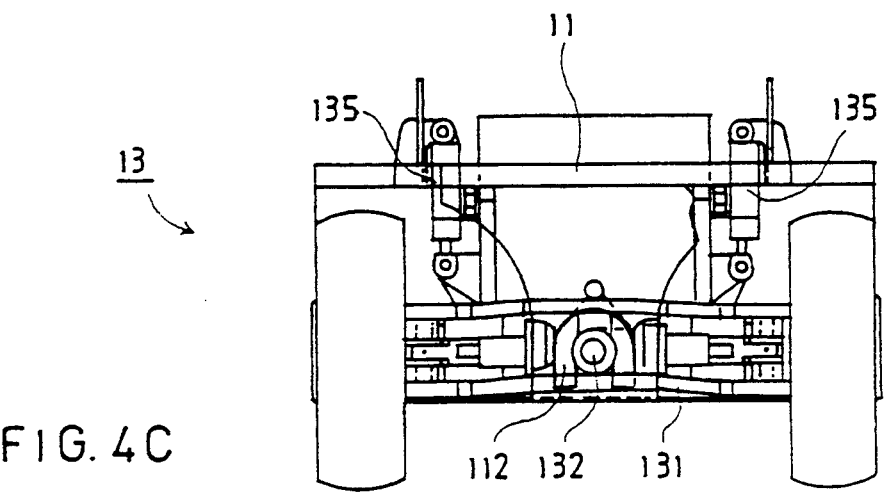

FIGS. 4A–4C illustrate the suspension of the steering axle unit of the truck 10. The truck frame is denoted with the reference numeral 11, and the steering axle unit generally with the reference numeral 13. The support and the spring suspension of an axle beam 131 of the steering axle unit 13 is, as in the case of the driving axle unit, accomplished by means of an articulated multi-link suspension. The multi-link suspension consists of upper suspension arms 133, lower suspension arms 134, and shock absorber units, i.e. spring units 135, which have been arranged substantially symmetrically in relation to the longitudinal center line of the truck 10.

In the embodiment shown in FIGS. 4A–4C, the lower suspension arms 134 are diagonal suspension arms, whose first fastening brackets 134a on the truck frame 11 are placed further apart from one another than the second fastening brackets 134b of the suspension arms placed on the axle beam 131. The upper suspension arms 133 are longitudinal suspension arms whose first fastening brackets 133a on the truck frame 11 are placed substantially equidistant from one another as the second fastening brackets 133b on the axle beam 131 are placed from one another. In respect of the steering axle unit, the fastenings of the suspension arms 133, 134 are provided with articulated joints.

As is further shown by FIG. 4B, the lower suspension arms 134 pass crosswise. This arrangement makes it easier to arrange the turning angle of the steering wheels to be as large as possible.

In the case of the steering axle unit, the same movement principles are true as was explained in relation to the driving axle unit. As is commonly known with respect to the suspension of axle units, by means of the illustrated embodiment, it is possible to prevent lateral movements of the axle beam 131. However, in other embodiments of the present invention this construction of the spring suspension might also be substituted e.g., by a solution in which both the upper and the lower suspension arms 133, 134 are diagonal suspension arms, (as shown in phantom in FIG. 4B) or by some other, corresponding construction which permits vertical movements of the axle beam 131 while substantially preventing lateral movements of the axle beam 131.

Spring units 125, 135, both of the driving axle unit 12 and of the steering axle unit 13, are attached by their first fastening brackets 125a, 135a to the truck frame 11 by means of articulated joints. The spring units 125, 135 are attached by their second fastening brackets 125b, 135b to the axle beam 121, 131 of the driving axle unit and of the steering axle unit, respectively, also by means of articulated joints in a corresponding way.

The spring units 125, 135 are adjustable so that it is possible, when desired, to switch the truck from the working position shown in FIG. 1 to the high-speed drive position shown in FIG. 2. For this reason, the spring units 125, 135 are preferably hydraulic cylinders, by whose means it is possible to regulate the height of the spring suspension. In such a case, each hydraulic cylinder is provided either with a built-in or an external, hydropneumatic pressure-accumulator/check-valve assembly, which operates as the spring/shock-absorber unit proper. The principle of operation of the spring suspension is most advantageously hydropneumatic.

The regulation of the height of the spring suspension is, in principle, as follows. When the truck 10 in accordance with the present invention is in working operation, i.e. when the truck 10 is in the position shown in FIG. 1, the spring suspension has been lowered to its lower position while the ground clearance is at the minimum. In this position, the frame 11 of the truck rests on the axle beams 121, 131. For this reason, stop faces 122 have been formed on the axle beam 121 of the driving axle, on which faces the frame 11 rests. In a corresponding manner, a stop 132 has been formed on the axle beam 131 of the steering axle.

According to FIGS. 4A–4C, the stop 132 is preferably a projection 132, similar to an axle journal, which may additionally be provided with bearings. For the stop 132, a fork 112 is arranged on the frame 11. The fork 112 operates as a counterpiece and is lower onto the stop 132 so that, by means of an assembly formed by the stop 132 and the fork 112, the axle beam 131 of the steering axle is pivotally supported on the truck frame 11. In the described embodiment, the spring suspension is not in operation.

When the truck 10 is used without a load, e.g., for high-speed transfer operation between work sites, the truck 10 is raised by means of the spring units 125, 135 (e.g. hydraulic cylinders) onto the support of its spring suspension, as shown in FIG. 2. Thus, when the truck 10 is raised onto the support of its spring suspension, its ground clearance is increased to the dimension b.

In a truck constructed in accordance with the invention, it is possible to arrange the spring suspension so that it can be adjusted continuously to the desired height. If desired, the range of adjustment of the spring suspension of the truck 10 can be selected large enough so that when the spring suspension is in the highest position, the truck 10 has good properties for cross-country driving. In addition, the dimensions of the spring suspension and the suspension arms 123, 124, 133, 134 of the truck 10 are selected so that they are capable of carrying the axle loads when the truck is unloaded.

When different alternative embodiments of the invention are compared, it might be considered that the spring suspension could also be designed in a different way. One such possibility would be to construct the spring suspension of the driving axle unit as "passive", i.e. as a suspension in which the spring/ shock-absorber units are not adjustable. In such a case, the units would be, e.g., mechanical units that are dimensioned so that, when the load is increased, the carrying capacity of the spring suspension proper is exceeded. Thus, the portion of the axle load that exceeds the carrying capacity would be transferred by means of the mechanical stops on the axles. In this case the adjustability of the spring suspension is reduced. Moreover, releasing the load would result in an uncontrollable change in the truck height or in the lifting height.

A "passive" suspension solution would also be detrimental to the steering axle of the truck because the loading of the truck lowers the axle load. A spring suspension dimensioned in accordance with an unloaded axle load would, when the load is lifted, raise the end of the truck next to the steering axle and, consequently, tilt the truck.

The examples provided above are not meant to be exclusive. Many other variations of the present invention would be obvious to those skilled in the art, and are contemplated to be within the scope of the appended claims.

What is claimed is:

1. A truck including lifting and loading equipment, comprising:
    a frame,
    at least one driving axle unit having an axle beam,
    a steering axle unit having an axle beam,
    a vertically adjustable spring suspension, said driving and said steering axle units being suspended on said frame by means of said spring suspension, and
    lifting and load handling equipment coupled to said frame,
    said spring suspension comprising
        vertically adjustable spring units adjustable between a suspended upper position and an unsuspended lower position, said frame resting on said axle beams of said driving axle unit and said steering axle unit when said spring units are in said lower position, and
        suspension arms structured and arranged to permit vertical movements of said axle units and to substantially prevent lateral movements of said axle units.

2. A truck as claimed in claim 1, further comprising stops or stop faces formed on said axle beams of said axle units, said frame rests on said stops or stop faces when said spring suspension is in said lower position.

3. A truck as claimed in claim 2, wherein said stop on said axle beam on said steering axle unit comprises a projection arranged on a longitudinal center line of the truck, said frame having a fork formed at the corresponding location such that said stop on said axle beam on said steering axle unit contacts said fork when said spring suspension is in said lower position, said contact between said fork and said stop forming a pivotal suspension for said steering axle unit.

4. A truck as claimed in claim 1, wherein at least four of said suspension arms are connected to said driving axle unit, said suspension arms connected to said driving axle unit comprising two longitudinal suspension arms and two diagonal suspension arms.

5. A truck as claimed in claim 4, wherein said longitudinal suspension arms are upper suspension arms and said diagonal suspension arms are lower suspension arms.

6. A truck as claimed in claim 1, wherein four of said suspension arms are diagonal suspension arms connected to said driving axle unit.

7. A truck as claimed in claim 1, wherein four of said suspension arms are connected to said steering axle unit of which at least two of said four suspension arms connected to said steering axle unit are diagonal suspension arms.

8. A truck as claimed in claim 7, wherein all four of said suspension arms connected to said steering axle unit are diagonal suspension arms.

9. A truck as claimed in claim 1, wherein said spring units are hydraulic cylinders, each of which communicates with a hydropneumatic pressure-accumulator and check-valve assembly that operates as a spring and shock-absorber unit.

10. A truck as claimed in claim 9, wherein said hydraulic cylinders are provided with built-in pressure-accumulator and check-valve assemblies.

11. A truck as claimed in claim 1, wherein the truck is a fork lift.

12. A truck as claimed in claim 1, wherein said spring units are arranged symmetrically in relation to a longitudinal center line of the truck.

13. A truck as claimed in claim 1, further comprising articulated joints to connect said suspension arms to said axle units.

14. A truck as claimed in claim 4, further comprising articulated joints to connect said suspension arms to said driving axle unit.

15. A truck as claimed in claim 6, further comprising articulated joints to connect said suspension arms to said driving axle unit.

16. A truck as claimed in claim 7, further comprising articulated joints to connect said suspension arms to said steering axle unit.

17. A truck as claimed in claim 7, wherein said diagonal suspension arms are arranged crosswise.

* * * * *